C. GRAVES, G. C. POWERS & C. O. GRAVES.
Milk-Coolers.

No. 145,732.                Patented Dec. 23, 1873.

Witnesses.
Geo. W. Kennedy
Leonard K. Graves

Inventor.
Cecil Graves.
George C. Powers.
Charles O. Graves.

UNITED STATES PATENT OFFICE.

CECIL GRAVES, GEORGE C. POWERS, AND CHARLES O. GRAVES, OF WATERBURY, VERMONT.

IMPROVEMENT IN MILK-COOLERS.

Specification forming part of Letters Patent No. 145,732, dated December 23, 1873; application filed August 7, 1873.

*To all whom it may concern:*

Be it known that we, CECIL GRAVES, GEORGE C. POWERS, and CHARLES O. GRAVES, of Waterbury, in the county of Washington and State of Vermont, have invented a new and Improved Mode for Cooling Milk, and keeping it at a proper temperature to facilitate the rising of cream for making a superior quality of butter.

The following is a full and exact description, reference being had to the accompanying drawings and to the letters of reference marked thereon.

Our invention consists in the employment of suction-draft pipes for the discharge of heated water, in connection with the water-supply pipes, and in other means employed for producing a rapid circulation of the same, and maintaining a uniform temperature of the milk to be cooled.

Figure 1:
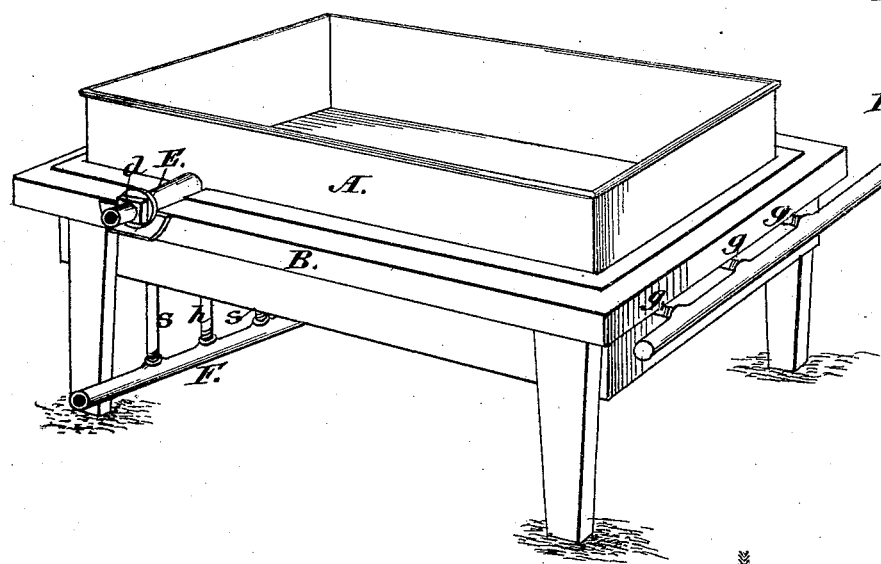
Figure 2:
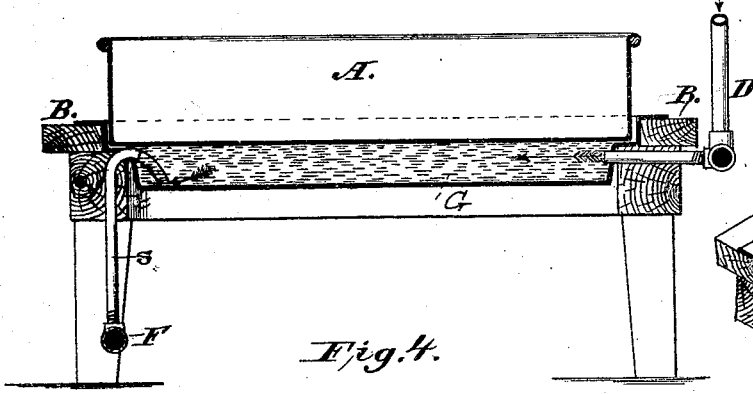
Figure 3:
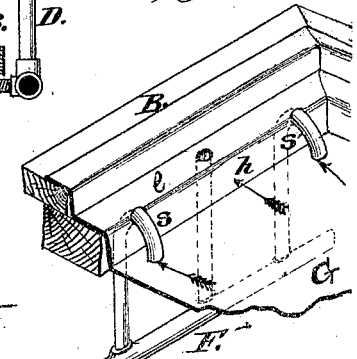
Figure 4:
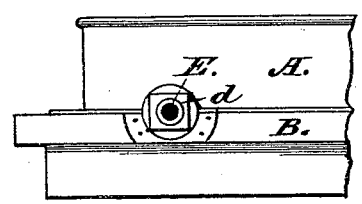

In the annexed drawing, Figure 1, A represents the milk-pan, four feet long, two feet wide, and six inches deep; B, the frame, with galvanized iron bottom G; C, the reservoir, always above the pan; D, the large feed-pipe; E, the milk-discharge pipe; F, the waste-water-discharge pipe; $g$ $g$ $g$, small supply-pipes; $h$, suction-draft or surface-discharge pipes; $s$ $s$, siphon-pipes, which take water from the bottom. Fig. 2 shows the ledges upon which the pan rests and the water-channel; $s$ $s$, Fig. 3, the siphon-pipes with a cross-sectional view. Fig. 4 shows the milk-discharge pipe with nut $d$ fitting water-tight to frame.

To enable others to make use of our invention, we proceed to describe its construction and operation.

Our pan is made of tin, and it may be of any shape or dimensions, provided it have a flat bottom. It is set into a frame, B, standing upon legs like a table, and also is provided with a flat bottom of galvanized sheet-iron, and sides somewhat resembling a pan or sink. Around the inside of this frame is a ledge or rest, $e$, upon which the milk-pan A rests, of sufficient height to leave a water-space of two or three inches between the milk-pan and the sheet-iron bottom of the frame.

The water for cooling the milk is let into the space under the pan A, at one end or side, by means of small pipes $g$, which pass through the side of the frame, and are supplied by a large feed-pipe, D, of at least double the capacity of the three small supply-pipes, which large pipe is supplied from a reservoir, C, placed at a greater altitude than that of the pan, so as to give a head pressure.

The discharge-pipes $s$ $h$ are placed at the opposite end or side of the pan from the supply-pipes, and consist of two or more surface-pipes, $h$, and two siphon-pipes, $s$. The surface-discharge pipes enter the frame perpendicularly through the top of the ledge or rest $e$, taking the warm water from the surface. The siphon-pipes enter through the ledge-rest near the top, and are projected into the water-space in the form of a circle, so as to take water from the bottom of the water-space, by which united action a uniform and uninterrupted flow of the water under the milk-pan is produced. These discharge-pipes descend perpendicularly a distance below the pan-frame, and discharge water into a waste-pipe, F, or vessel provided for that purpose, by which means it will be observed that the circulation of the cooling element is greatly accelerated by the natural force employed—namely, the force of atmospheric pressure. Thus the water from the reservoir C flows through the large feed-pipe D, and, by head pressure, is forced through the supply-pipes $g$ $g$ $g$, and, passing rapidly along under the milk-pan, is finally drawn out by the still increased force of the discharge-pipes acting upon the principle of atmospheric pressure.

The pan is made enough smaller than the frame to allow it to set into the frame, and upon the rests made for its support; and is made sufficiently shorter to admit of a free open-air space on the water-surface immediately above the discharge-pipes, for the purpose of obtaining the desired atmospheric pressure.

The pan can be easily removed from the frame for the purpose of cleaning; and is provided with a large pipe, E, which enters the pan A on a level with the bottom, and is used for the discharge of milk. This pipe is sunk into the frame one-half its diameter only, to permit the removal of the pan when desirable, and is held firmly in place by a nut, $d$, at the end of the pipe, which presses against the sides of the frame, yet may be removed by a single turn of the hand when the pan is to be taken off.

The pan containing the milk to be cooled is placed upon the rests of the frame. The cold water from the reservoir C passes down through the large feed-pipe D, enters the supply-pipes $g\ g\ g$, and passes into the water-space G under, and, coming in contact with the bottom of the milk-pan A, flows along to the other end of the frame, and, by the suction of the discharge-pipes $s\ s$ and $h$, is rapidly drawn out and discharged, thus producing a constant, free, and rapid circulation, and uniformity of temperature of water under the milk-pan.

What we claim as our invention, and desire to secure by Letters Patent, is—

The combination of the supply-pipes $g\ g\ g$ with the discharge-pipes $h$ and $s\ s$, and the milk-pan A, as and for the purpose specified.

CECIL GRAVES.
GEORGE C. POWERS.
CHARLES O. GRAVES.

Attest:
CURTIS WELLS,
GEO. KENNEDY.